United States Patent
Lissotschenko et al.

(10) Patent No.: US 6,437,896 B1
(45) Date of Patent: Aug. 20, 2002

(54) DEVICE FOR DEVIATING ELECTROMAGNETIC RAYS OR RADIATION BEAMS IN THE OPTICAL SPECTRAL DOMAIN

(76) Inventors: Vitalij Lissotschenko, Tospelliweg 19, D-44149 Dortmund; Joachim Hentze, Haus Lohe 1, D-59457 Werl, both of (DE)

(*) Notice: Subject to any disclaimer, the term of this patent is extended or adjusted under 35 U.S.C. 154(b) by 0 days.

(21) Appl. No.: 09/657,763

(22) Filed: Sep. 8, 2000

(51) Int. Cl.⁷ .............................. G02B 26/08
(52) U.S. Cl. ............ 359/196; 359/201; 359/202; 359/203; 359/209; 359/210; 359/211
(58) Field of Search .................. 359/196, 203, 359/209, 212, 223, 226

(56) References Cited

U.S. PATENT DOCUMENTS 5,045,679 A    9/1991   Suzuki et al. ............ 250/201.1
5,390,024 A    2/1995   Wright ........................ 356/376

FOREIGN PATENT DOCUMENTS

| DE | 19514626 A1 | 10/1996 | ............ G02B/27/09 |
| DE | 19610881 A1 | 6/1997  | ............ G02B/7/00  |
| EP | 0363347     | 4/1990  | ............ G06K/15/12 |

*Primary Examiner*—James Phan
(74) *Attorney, Agent, or Firm*—Hoffman, Wasson & Gitler

(57) ABSTRACT

The invention concerns a device for electromagnetic rays or radiation beams in the optical spectral domain, in particular for laser beams, comprising at least a deviating element provided with at least one interface with optical function which can, by refraction or reflection, deviate a ray. The interface having the optical function has a curve such that, in one first direction (X) substantially along the interface, the local inclination thereof permanently varies, at least by sections, relative to a direction (Y) substantially along the interface and practically perpendicular to the first direction (X). Advantageously, the interface with the optical function is twisted, preferably shaped like a propeller.

20 Claims, 6 Drawing Sheets

DEVICE FOR DEVIATING ELECTROMAGNETIC RAYS OR RADIATION BEAMS IN THE OPTICAL SPECTRAL DOMAIN

CLAIM OF PRIORITY

This application claims priority to PCT application No. PCT/EP99/01546 having publication number WO 99/46625 filed Sep. 16, 1999 this application claiming priority to German Application No. 198 10 245.3 filed Mar. 10, 1998 and German Application No. 198 18 531.6 filed Apr. 24, 1998.

FIELD OF THE INVENTION

The current invention concerns a device for redirecting electromagnetic beams or ray bundles in the visible spectrum range, in particular laser beams, containing one or more deflecting elements with one or more optically functional interfaces that cause the deflection of a beam or ray bundle striking them by refraction or reflection.

PRIOR ART

As an example, a multifaceted, rotatable mirror can be employed as a redirecting device of the type mentioned. In addition, the possibility exists of using arrays of cylindrical lenses for redirecting beams. In order to redirect a beam in two mutually orthogonal directions with such arrays, however, two arrays of cylindrical lenses are required for each direction of deviation so that, for a redirection into mutually independent directions, a total of four cylindrical lens arrays would be needed. Both redirecting devices described above, according to the current state of the art, are of complex construction and can be produced only at relatively great expense.

SUMMARY OF THE INVENTION

The basic task of the current invention is the creation of a redirecting device of the type mentioned at the beginning with a less complicated and more economical construction.

This is achieved according to the invention by the distinguishing characteristics of Claims 1 through 26. According to the invention, the optically functional interface is bent in such a way that along a first direction, lying essentially in the optically functional interface, the local inclination of the optically functional interface varies continuously, at least segment-wise, relative to a direction lying essentially in the optically functional interface somewhat orthogonal to the first direction. Utilizing the continuous variation of the inclination of the optically functional interface in one direction relative to the direction perpendicular to it, a redirecting device can be realized from such an optically functional interface according to the invention without great expense. Depending on the contact point of a ray on the optically functional interface along a given direction, the ray is redirected through a small or large angle in the directions orthogonal to it.

In one alternative embodiment of the current invention, the one or more deflecting elements have a somewhat rectangular shape with two surfaces facing one another serving as optically functional interfaces. These optically functional interfaces are twisted surfaces that can preferably be formed as surfaces that can be cut at an angle of 45° from a concave-convex cylindrical lens with orthogonal alignment of the cylindrical axes. Likewise for surfaces of this type, the local inclination varies continuously, at least segment-wise, along a first axis relative to a direction oriented essentially orthogonal to it. Based on the fact that one is dealing with twisted cylindrical surfaces, it is useful to employ two twisted surfaces facing one another at relative right angles since one can compensate for image distortions in this way.

Preferably, the deflecting element is provided with positioning devices, which are realized either as a displacement device or else as a rotation device. A possibility as displacement device, for example, is a piezoelectric element, which can displace the deflecting element in one or two mutually orthogonal directions. In addition, rotation devices can be employed which can at least partially rotate the deflecting element around an axis standing essentially perpendicular to the optically functional interface. The possibility further exists to combine displacement and rotation devices so that the directions in which the incoming arrays are redirected can be chosen freely.

In a preferred embodiment of the current invention, the optically functional interface is a twisted, preferably propeller-like, surface. In this way, the deflecting element can have a somewhat quadratic shape wherein the surface opposite the optically functional interface is flat. With the preferred propeller-like surface, an infinitesimally small area around the central point of the optically functional interface is parallel to the opposing flat surface of the deflecting element. This has the advantage that in the optically functional interface two lines oriented roughly orthogonal to one another run through the approximate central point, along each of which lines the local inclination of the optically functional interface does not vary in the direction of the line itself, whereas along either of the lines the local inclination of the optically functional surface varies continuously in a direction perpendicular to the respective line. In this way, it is guaranteed that by displacing the deflecting element in a given direction the ray to be deflected is deflected through a more or less sizable angle only in a direction orthogonal to this direction but not in the direction in which deflecting element was displaced. Thus, two displacement devices, which can displace the deflecting element in two mutually orthogonal directions, can bring about the deflection of the ray in two mutually independent directions. Furthermore, by rotation of such a deflecting element according to the invention, one can produce an applicable rotating focus point of a redirected laser beam, particularly advantageous for laser beam welding.

In a preferred embodiment of the current invention, the redirecting device can comprise a number of deflecting elements, which are combined into an array where the individual deflecting elements are each arranged side-by-side, in the same orientation, parallel to one another. Such an arrangement allows the simultaneous redirection of several mutually parallel beams or ray bundles.

In a preferred embodiment of the current invention, the redirecting device comprises one or more deflection modules wherein each of the deflecting components comprises two deflecting elements. Here, the optically functional interfaces of the deflecting elements of each deflection module correspond to each other in such a way that the surfaces can be made to mesh, at least segment-wise. Moreover, all of the deflecting elements can, for example, be shaped identically. It is advantageous to have the deflecting elements so arranged in each deflection module that their optically functional surfaces essentially face each other in the direction of the beam or ray bundle to be deflected, whereby the two deflecting elements can be displaced in mutually opposite or in two mutually orthogonal directions that are oriented essentially parallel to the optically functional surfaces. Such an arrangement offers the advantage that, for deflecting elements not displaced relative to one another and directly facing each other, even extended ray bundles pass through the deflection module formed from the two deflecting elements undeflected or in any case with parallel displacement. Even ray bundles with very large beam cross-section experience no increase in their beam divergence in passing through such a deflection module. Only when the deflecting elements are displaced relative to each other does a deflection come about, for example in a direction orthogonal to the displacement direction, with still no increase in beam divergence.

The deflecting elements can, for example, have the propeller-like surfaces described above. The possibility also exists, however, that the deflecting elements have optically functional interfaces with parabolic convex or parabolic concave shapes facing each other.

The possibility further exists of using arrays of deflecting elements in place of the deflecting element in the deflection modules mentioned, thereby creating the possibility of redirecting beams or ray bundles with even larger cross-sections.

The possibility further exists that the redirecting device comprises two deflection modules, each having two deflecting elements. These deflection modules can then be arranged one after the other in the beam path of the beam or ray bundle to be redirected so that in the first deflection unit a deflection is performed in a first direction and in the second deflection module a deflection in a second direction orthogonal to the first direction. In this way, the deflection of beams in two mutually independent directions can also be separated spatially from one another.

In a preferred embodiment of the current invention, the deflecting elements are made from a material that is at least partially transparent to the wavelengths of the electromagnetic beams or ray bundles to be redirected, such as, for example, quartz or glass. As an alternative to this, the optically functional interface can be provided with a mirror treatment that is at least partially reflective for the wavelengths used in the electromagnetic beams or ray bundles to be redirected, preferably vapor-plated with an appropriate material, such as gold for example, and consequently used for beam deflection by reflection.

A further solution according to the invention envisions that the redirecting device comprises a deflection module consisting of two deflecting elements in which the first deflecting element is realized as a biconvex cylindrical lens and the second deflecting element as a piano-convex cylindrical lens where the flat optically functional interface of the second cylindrical lens essentially faces one of the convex optically functional interfaces of the first cylindrical lens and where the cylindrical axes of the cylindrical lenses are tilted slightly relative to one another. By displacing the deflection module consisting of the two cylindrical lenses, for example in a direction perpendicular to the impinging beam, the beam or the ray bundle can be redirected upward or downward. Based on the fact that three cylindrical surfaces are employed as optically functional interfaces, any image distortions that might arise are corrected.

Further advantages and features of the current invention are clarified using the following description of preferred embodiments with reference to the accompanying figures. In them are shown:

DETAILED DESCRIPTION OF THE DRAWINGS

FIG. 3b a view as indicated by the arrow IIIb in FIG. 3a;

FIG. 3c a view as indicated by the arrow IIIc in FIG. 3a;

FIG. 4a a back view of a deflecting element according to the invention that is rotatable;

FIG. 4b a view as indicated by the arrow IVb in FIG. 4a;

FIG. 4c a view as indicated by the arrow IVc in FIG. 4a;

FIG. 5b a schematic illustration of the ray paths of three selected light rays through the deflection module as in FIG. 5a;

FIG. 6b a schematic illustrations of the ray paths of two chosen light rays through the arrangement as in FIG. 6a;

FIG. 7b a schematic illustration of the ray paths of selected light rays through the arrangement as in FIG. 7a;

FIG. 8b a view as indicated by the arrow VIIb in FIG. 8a;

FIG. 9b a partial cutout view according to the arrow IXb in FIG. 9a;

DETAILED DESCRIPTION OF A PREFERRED EMBODIMENT

Figure 1:
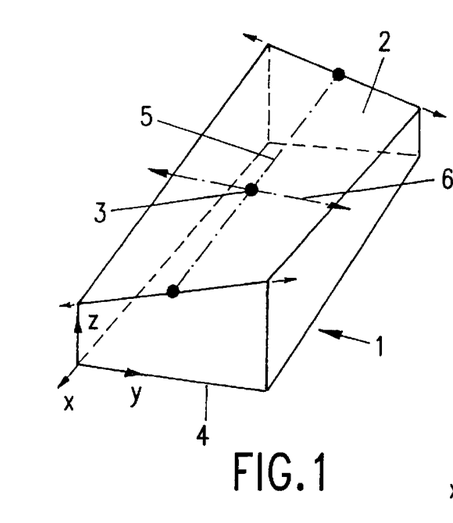
FIG. 1 a perspective view of a deflecting element according to the invention.

One can see in FIG. 1 a deflecting element (1) according to the invention that has an essentially rectangular shape with a twisted surface (2) (on top in FIG. 1) which can be used as an optically functional interface. For better illustration, a two- or three-dimensional coordinate system (x, y, z) is included with each of the figures. The twisted surface (2) has a point (3) roughly in its center that is distinguished in that an infinitesimally small area in its vicinity has an orientation parallel to the surface (4) opposite the surface (2). A light ray, in particular a laser beam, impinging on the surface (4) in the z-direction at a point lying opposite the point (3) would pass undeflected out of the deflecting element (1) through the point (3).

Within the surface (2), a line (5) with constant z-value extends through the point (3) in the x-direction. Infinitesimally small surfaces around points of this line (5) have different inclinations in the y-direction along the line (5) but have no inclination in the x-direction. Further, a line (6) with constant z-value extends within the surface (2) through the point (3) perpendicular to the line (5). Infinitesimally small surfaces around points of the line (6) have continuously varying inclinations in the x-direction along the line (6) but have no inclination in the y-direction. Every other infinitesimally small surface of the twisted surface (2) not including the lines (5, 6) is inclined in both the x-direction as well as the y-direction.

One can imagine that the twisted surface (2) as pictured in FIG. 1 comes about, for example, when the upper surface of a rectangle is twisted counterclockwise along its front edge extending in the y-direction in FIG. 1 and clockwise along its back edge extending in the y-direction in FIG. 1. Points along the line (6), which extends in the y-direction parallel to the front and back upper edges roughly in the middle, are not twisted along. The twisted surface (2) consequently has a certain similarity with the surface of a propeller. While the front edge in FIG. 1 has increasing z-value with increasing y-values, the back edge in FIG. 1 has decreasing z-value with increasing y-values. The right edge of the twisted surface (2) in FIG. 1 has increasing z-value with increasing x-values while in contrast, the left edge in FIG. 1 has decreasing z-value with increasing x-values.

The four side surfaces running between the twisted surface (2) and the flat surface (4) facing across from it in the deflecting element (1) each have the shape of a scalene trapezoid where each of the side edges running between the surfaces (2, 4) have parallel alignment, run in the z-direction and therefore form the sides of these trapezoids that run parallel to one another. Of the not mutually parallel sides of each trapezoid, the edge of each that borders the surface (4) is perpendicular to both of the side edges.

The pictured embodiment of a deflecting element (1) according to the invention is realized in a stretched-out form so that its dimensions in the x-direction are greater than those in the y-direction. Nevertheless, the possibility remains to choose dimensions in the x-direction and y-direction of equal size.

Figure 2:
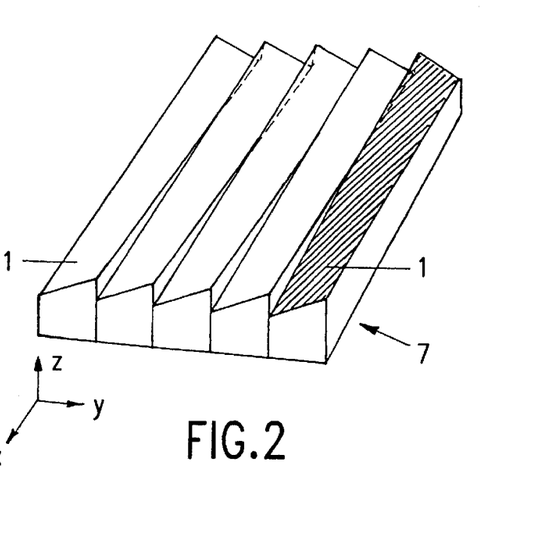
FIG. 2 a perspective view of an array of deflecting elements according to the invention as in FIG. 1.

In FIG. 2, one can see an array (7) of deflecting elements (1) according to the invention, which, in principle, is formed from a number of deflecting elements (1) lying side-by-side and parallel to one another.

Figure 3A:
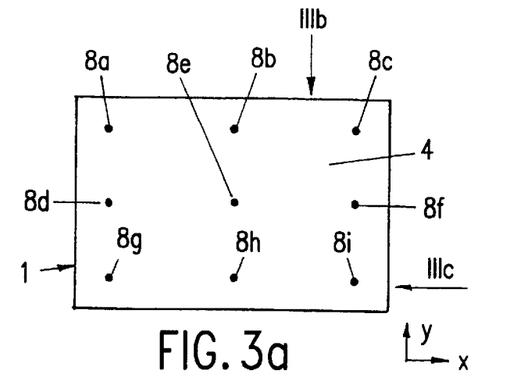
FIG. 3a a back view of a deflecting element according to the invention as in FIG. 1 with light beams impinging on it.
Figure 3B:
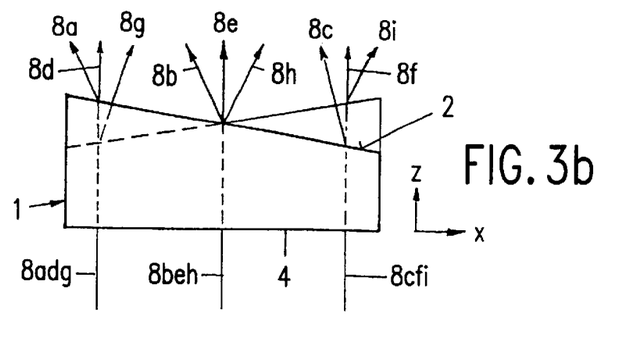
Figure 3C:
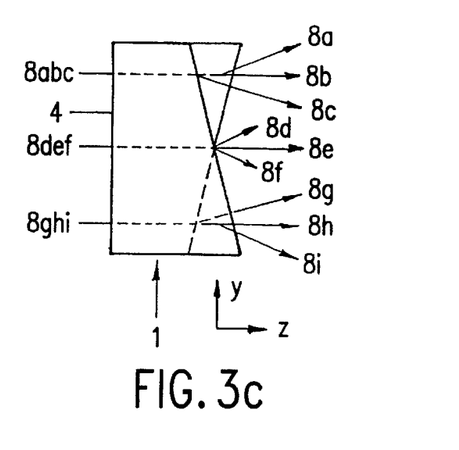

In FIG. 3, the beam paths of selected light rays (8a to 8i), in particular laser beams, are described. The light rays (8a to 8i) impinge in the z-direction on the flat surface (4) facing opposite the twisted surface (2). The striking points of the light rays (8a to 8i) can be seen in FIG. 3a. From the top and side views in FIG. 3b and FIG. 3c can be seen how the individual light rays (8a to 8i) are deflected upward or downward as well as to the left or to the right upon exiting from the twisted surface (2). As already explained above for FIG. 1, the light rays (8d, e, f) that impinge along the line (5) are not deflected in the x-direction, that is, neither to the left nor to the right in FIG. 3b, upon exiting from the twisted surface (2). Likewise, the light rays (8b, e, h) that impinge along the line (6) are not deflected in the y-direction, that is, neither upward nor downward in FIG. 3c, upon exiting from the twisted surface (2). It can be seen however that light rays (8a, c, g, i) that impinge on points not on the lines (5, 6) are deflected in both the x- as well as the y-direction upon exiting from the twisted surface (2).

A redirecting device according to the invention can, for example, be prepared so that the deflecting element (1) described above is provided, for example, with a device that makes displacement in the x- and in the y-direction possible. This can, for example, be accomplished with a commercially available piezoelectric adjusting device. As an example, a light ray (8e) that strikes the point facing across from the point (3) when the deflecting element is not displaced in the x- and/or y-direction can then be deflected in the x-direction when the deflecting element (1) according to the invention is displaced upward or downward in the y-direction and the light ray strikes, for example, at locations on the surface (4) that correspond to the striking points of the light rays (8b and 8h) shown in FIG. 3a. A deflection of an impinging light ray in the y-direction can be realized when the deflecting element (1) according to the invention is displaced in the x-direction so that light rays originally striking roughly in the center impinge, for example, on points on which the light rays (8d and 8f) impinge in FIG. 3a.

A directing device of this type is particularly appropriate for light beams with a relatively small cross-section, since rays with a comparatively large beam cross-section will pass through regions of the twisted surface (2) that differ markedly from one another whereby such a beam would be strongly divergent after passing through the surface (2).

Figures 4A, 4B:
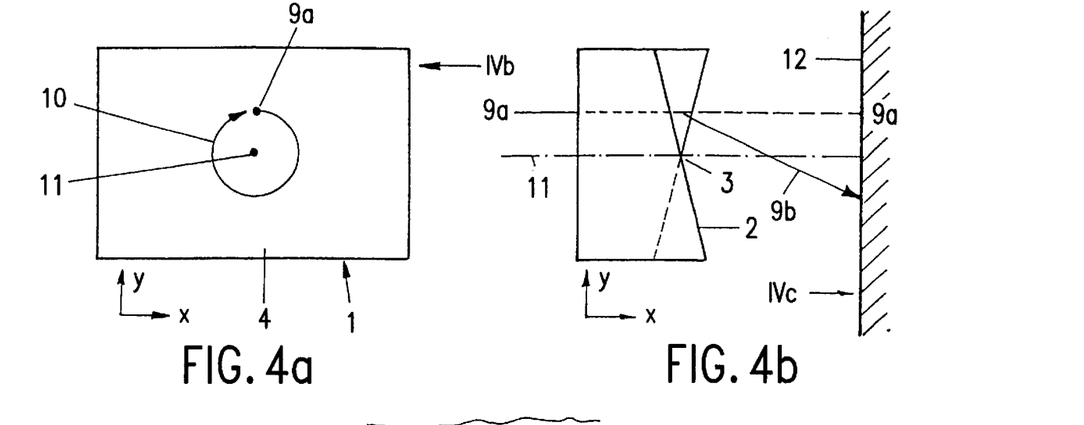
Figure 4C:
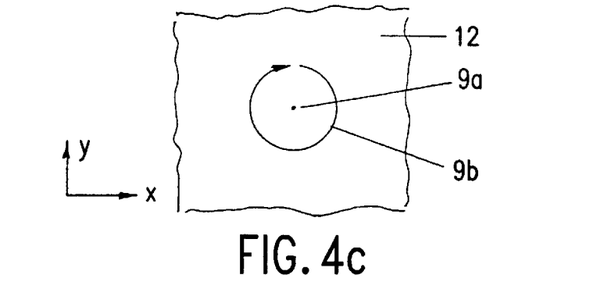

In FIG. 4 is shown how a light ray (9a) that strikes, for example, a point on the surface (4) of a deflecting element (1) facing across from somewhat above the point (3) is deflected when the entire deflecting element rotates, as indicated by the circular arrow (10), around an axis (11) that extends in the x-direction and passes through the point (3). The deflected ray (9b) would thereby impinge, for example, on a wall (12) shown schematically in FIG. 4b and FIG. 4c. As can be seen in FIG. 4c, the ray (9b) striking a wall describes a circle corresponding to the rotation of the deflecting element (1) in which the center of this circle is formed by the schematically indicated, undeflected impinging ray (9a).

The possibility further exists to combine the deflection devices pictured in FIG. 3 and FIG. 4 with each other so that, for example, after rotating the deflecting element (1) through a certain angle, a displacement of the deflecting element (1) with, for example, piezoelectric elements in mutually orthogonal directions, causes a deflection of an impinging light ray in directions x', y', which are rotated relative to the original coordinates x, y through the angle targeted by the rotation of the deflecting element (1). A combination of the rotation motion of the deflecting element (1) and the linear displacement in two mutually orthogonal directions therefore makes possible an arbitrary, versatile deflection of light rays impinging on the deflecting element (1).

Figure 5A:
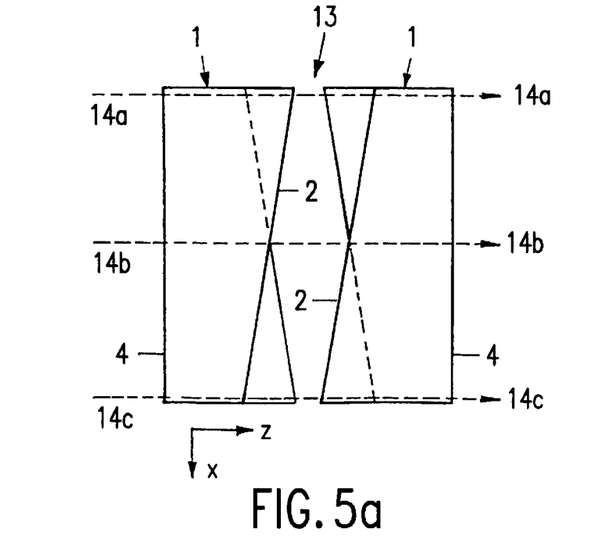
FIG. 5a a top view of a deflection module according to the invention that consists of two deflecting elements according to the invention.
Figure 5B:
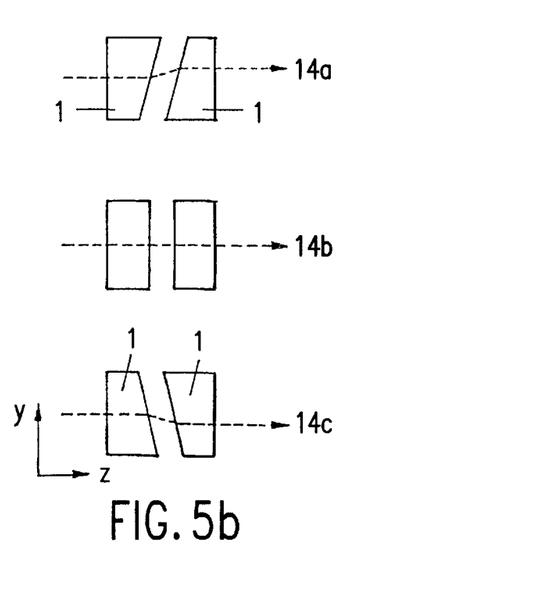
Figure 6A:
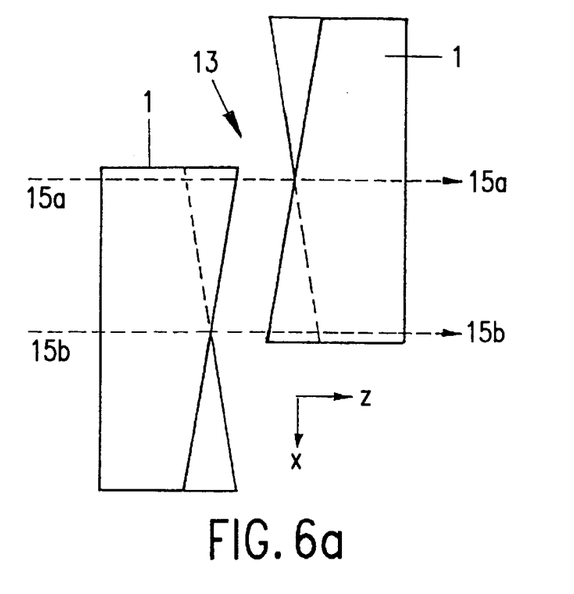
FIG. 6a a top view of the deflection module as in FIG. 5a with deflecting elements displaced relative to one another.
Figure 6B:
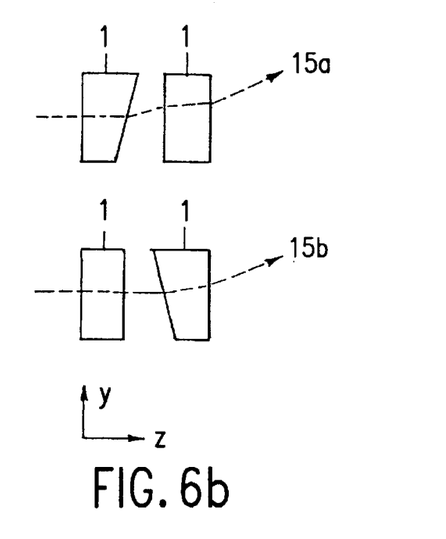
Figure 7A:
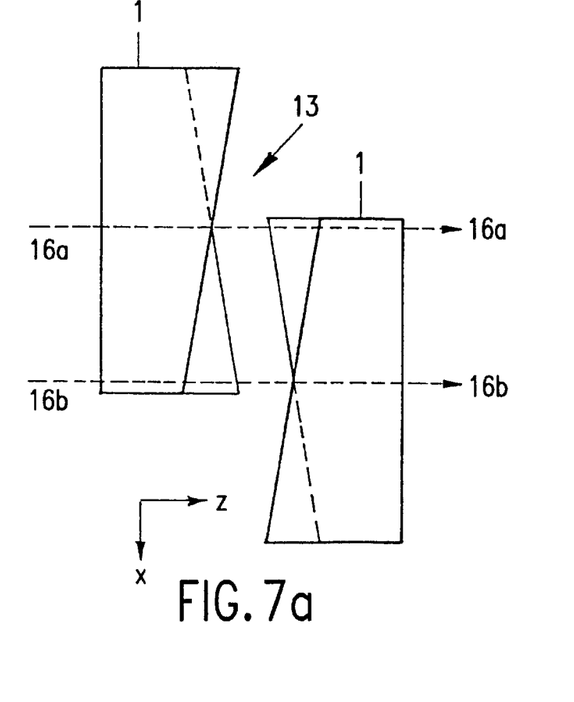
FIG. 7a a top view of the deflection module as in FIG. 5a with deflecting elements displaced relative to one another.
Figure 7B:
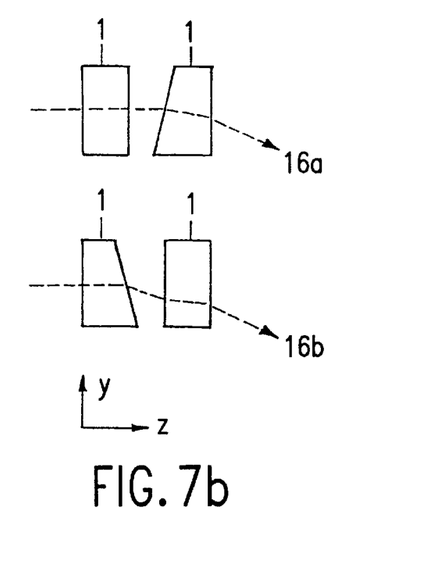

In FIG. 5 to FIG. 7, can be seen an embodiment of a redirecting device according to the invention that also enables the redirection of beams with larger cross-section. The redirecting device pictured therein comprises a deflection module (13) that consists of two deflecting elements (1). Both deflecting elements (1) are arranged with their twisted surfaces (2) directed toward one another so that their respective surfaces (4) facing across from the twisted surfaces (2) are oriented parallel to one another. In the initial arrangement of the deflection module (13) pictured in FIG. 5a, both deflecting elements (1) are aligned with each other so that they are merely separated from one another in the z-direction. For simplicity, one can think of both deflecting elements as being formed when a rectangular block is split into two pieces along the twisted surface (2) common to both deflecting elements (1). The two pieces are then finally separated a bit from one another along the z-direction.

In FIG. 5a, light rays (14a, b, c) impinging on one of the two plane surfaces (4) are drawn that pass undeflected through the deflection module (13). In FIG. 5b, which shows schematically the passage of individual rays (14a, b, c) through the deflection module (13), one can see that the rays (14a, c) emerge from the right deflecting element (1) in FIG. 5b somewhat parallel offset in the y-direction from the impining rays (14a, c) yet still traveling precisely in the z-direction.

It can be seen in both FIG. 6 and FIG. 7 that a displacement of the deflecting elements (1) relative to one another in the x-direction causes a deflection of the impinging rays (15a, b or 16a, b) in the positive or negative y-direction. The rays (15a, b or 16a, b) impinging parallel on the deflection module (13) also travel parallel to one another after the deflection. Just as in the embodiments in FIG. 3 and FIG. 4, the individual deflecting elements (1) can here also be offset linearly relative to one another by piezoelectric elements or the like. The possibility further exists to make the deflecting elements (1) pictured in FIG. 5 to FIG. 7 so that they can be offset with respect to one another in both the x-direction as well as the y-direction.

Figure 8A:
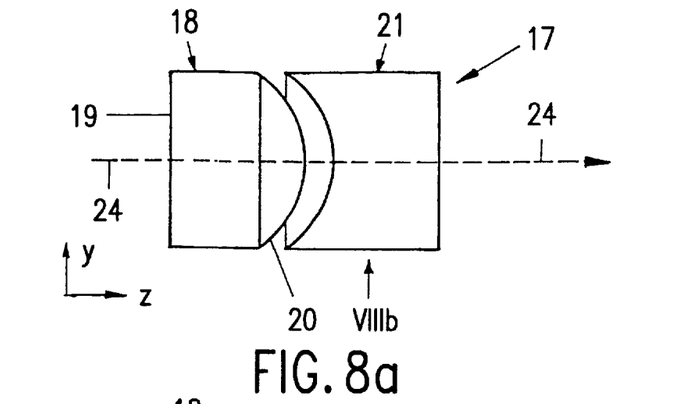
FIG. 8a a top view of the another embodiment of a deflection module according to the invention.
Figure 8B:
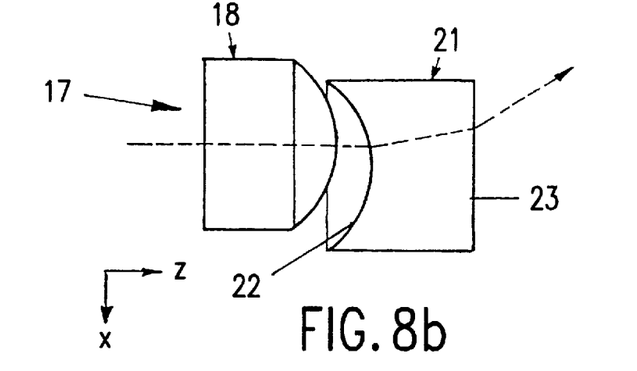

A further embodiment of a deflection module (17) according to the invention can be seen in FIG. 8. The deflection module (17) comprises a first deflecting element (18) composed of a plane entrance surface (19) in the x-y-plane, situated to the left in FIG. 8a, and a convex, parabolic shaped surface (20) across from it in the z-direction. The deflection module (17) further includes a second deflecting element (21) whose surface (22) facing the first deflecting element (18) has a concave, parabolic shape. The surface (23) across from the surface (22) in the z-direction is flat and lies in the x-y-plane. As with the embodiments in FIG. 5 to FIG. 7, the two parabolic surfaces (20, 22) facing one another in the embodiment in FIG. 8 appear as if a cubic body were split along these surfaces (20, 22) and, after the split, the two parts were separated from one another in the z-direction.

A ray (24) impinging roughly in the center of the plane entrance surface (19) of the first deflecting element (18) would pass undeflected, as can be seen in FIG. 8a, through the deflection module (17). If, as pictured in FIG. 8b, the second deflecting element (21) is offset relative to the first deflecting element (18), in the x-direction for example, the ray (24) would be deflected likewise in the x-direction. A deflection module (17) of this type is quite appropriate for relatively large beam cross-sections but not for large deflections since, as a result of the parabolic surfaces (20, 22) lying relatively close to one another, a displacement of the deflecting elements (18, 21) relative to one another is only possible over very short distances. Furthermore, because of the parabolic surfaces (20, 22), one cannot realize, for large relative offsets of the deflecting elements (18, 21), a deflection angle of the ray (24) that increases linearly with the offset of the deflecting elements (18, 21).

Figure 9A:
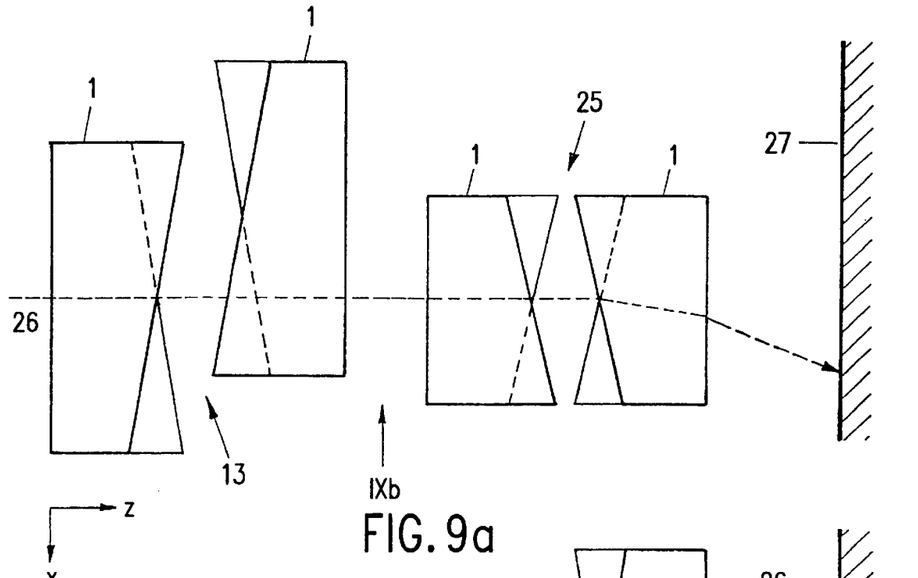
FIG. 9a a partial cutout top view of a deflection module according to the invention that comprises four deflecting elements.
Figure 9B:
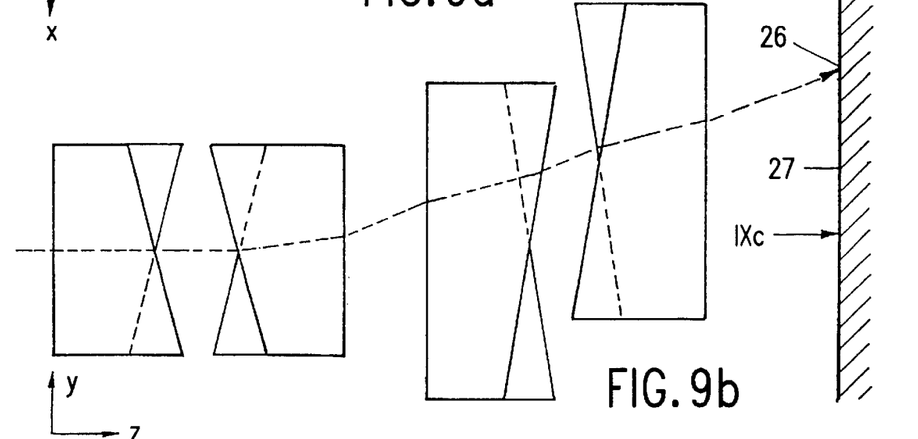
Figure 9C:
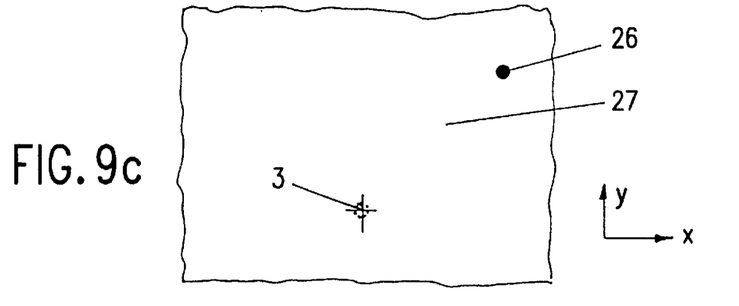
FIG. 9c a view as indicated by the arrow IXc in FIG. 9b.

In FIG. 9, a further redirecting device according to the invention is seen which comprises the two deflection modules (13, 25) each having two stretched-out deflecting elements (1). The deflection modules (13, 25) are oriented perpendicular to each other so that, by offsetting the deflecting elements (1) of the first deflection module (13) relative to each other in their lengthwise direction, an impinging beam (26) can be deflected in the y-direction and, by offsetting the deflecting elements (1) of the second deflection module (25) relative to each other in their lengthwise direction, an impinging beam (26) can be deflected in the x-direction. One can see in FIG. 9c how a light ray (26), impinging on a wall (27) for illustration, is deflected from its original direction, which is shown schematically in the z-direction through the point (3) of the first deflecting elements (1), in both the x- as well as y-direction.

Figure 10:
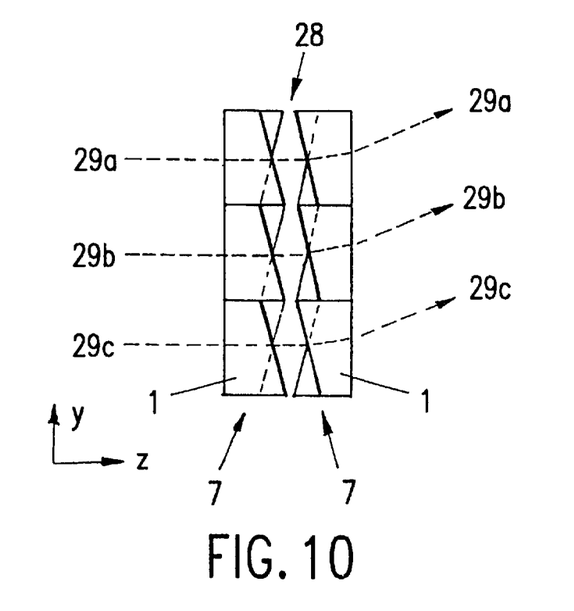
FIG. 10 a top view of a deflection module that consists of two arrays of deflecting elements.

In FIG. 10, in an embodiment of a redirecting device according to the invention can be seen that has a deflection module (28) consisting of two arrays (7) of deflecting elements (1). The two arrays (7) are offset relative to one another in the x-direction so that parallel rays (29a, b, c) impinging on the first array (7) are redirected in the y-direction parallel to each other by the deflection module. By employing arrays (7) of this type that can be offset relative to one another in the x- or y-direction, beams with very large cross-sections can also be redirected arbitrarily without problem.

Figure 11:
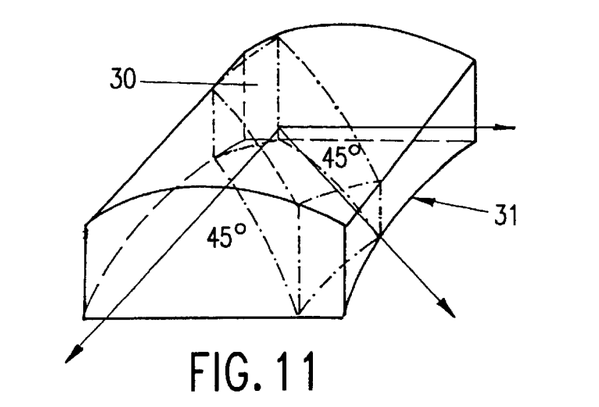
FIG. 11 a perspective view of a concave-convex cylindrical lens with orthogonal alignment of the cylindrical axes out of which a further design of a deflecting element according to the invention can be cut.
Figure 12:
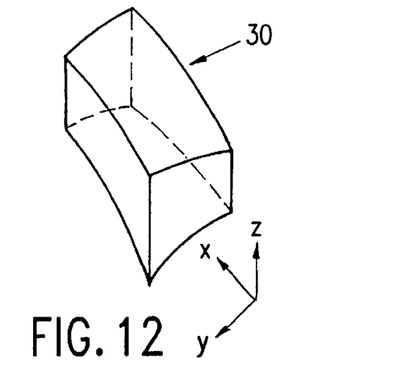
FIG. 12 a perspective view of a further design of a deflecting element according to the invention that can be cut out from the cylindrical lens pictured in FIG. 11.

A further deflecting element (30) according to the invention can be seen in FIG. 12. The deflecting element (30) according to the invention can, for example, be cut out from a concave-convex cylindrical lens (31) with orthogonal alignment of the cylindrical axes. This is illustrated in FIG. 11 where it is seen that the deflecting element (30) has upper longitudinal edges that are oriented at an angle of 45° to the cylindrical axes of the cylindrical lens (31). Based on the geometry of the deflecting element (30), this has very similar optical behavior to the deflecting element (1) having a twisted optically functional surface (2). With the deflecting element (30), the deflecting effect is increased since both of the surfaces across from each other in the z-direction in FIG. 12 can be employed as optically functional interfaces. The possibility also exists to combine the deflecting element (30) into arrays of deflecting elements (30).

Figure 13:
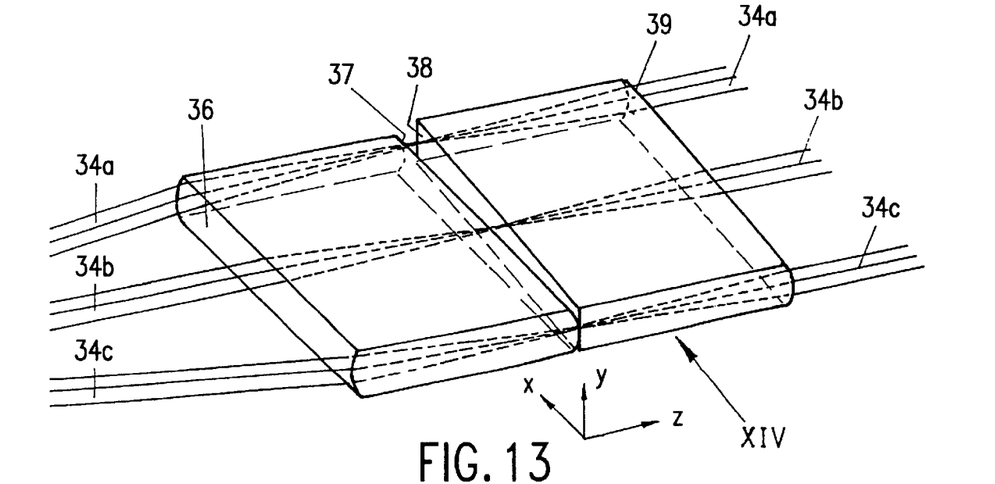
FIG. 13 a perspective view of a further design of a deflection module according to the invention.
Figure 14:
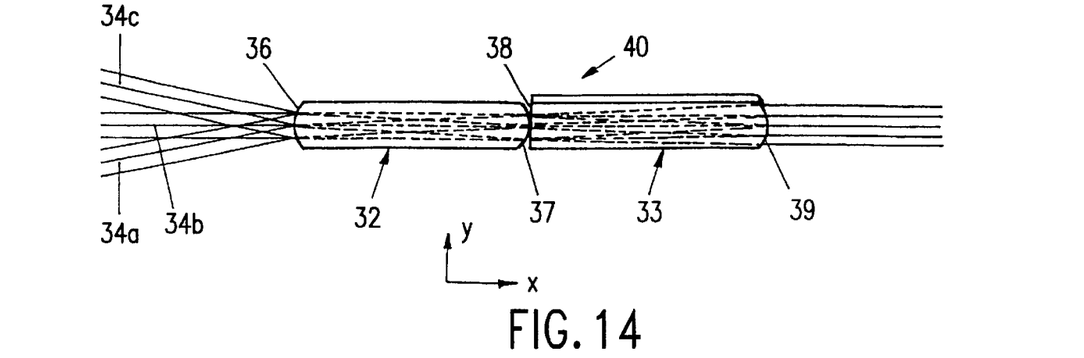
FIG. 14 a view as indicated by the arrow XIV in FIG. 13.

A further embodiment of a deflection module (40) according to the invention can be seen in FIG. 13 and FIG. 14. The deflection module consists of two cylindrical lenses (32, 33) one of which has the form of a biconvex cylindrical lens (32) with optically functional interfaces (36, 37) and the other a plano-convex cylindrical lens (33) with optically functional interfaces (38, 39). As can be seen in FIG. 13 and FIG. 14, the two cylindrical lenses (32, 33) are arranged in such a way that one of the optically functional interfaces (37) of the first cylindrical lens (32) runs essentially along the plane optically functional interface (38) of the second cylindrical lens (33). The deflecting action according to the invention is realized by having the cylindrical lens (33) tipped somewhat out of the x-z-plane so that the upper edges bordering the adjacent optically active interfaces (37, 38) of the cylindrical lenses (32, 33) have, for example, an angle of roughly 5° to 10° relative to one another.

In FIG. 13 and in FIG. 14, parallel ray bundles (34a, b, c) are pictured that impinge from the right, that is, on the right optically functional interface (39) of the cylindrical lens (33) in the relative z-direction in FIG. 13 and FIG. 14. It can be seen that the ray bundles (34a, b, c) formed by the cylindrical surface (39) are focused on the plane interface (38) across from it. The ray bundles emerging from the interface (38) impinge on the cylindrical surface (37) such that the three focus points of the ray bundle (34a, b, c) lie along a line that is tilted relative to the cylindrical axis of the cylindrical surface (37) by an angle that corresponds to the angle between the two cylindrical lenses (32, 33). Since the focal length of the cylindrical surface (36) corresponds to the distance between the cylindrical surface (36) and the cylindrical surface (37), the ray bundles (34a, b, c) emerge from the cylindrical surface (36) in the negative z-direction as bundles of mutually parallel rays. Due to the fact that the foci of these ray bundles (34a, b, c) are arranged on the facing cylindrical surface (37) along a line that is oblique to the cylindrical axis, the outside ray bundles (34a, c) not passing through the cylindrical axis of the surface (37)

exhibit a ray component in the positive or negative y-direction. This can be seen in FIG. 13 and FIG. 14.

The deflection module (40) can thus be employed as a deflection module by displacing it as a whole in the positive or negative y-direction [x-direction?] relative to the impinging beam and causing a corresponding deflection of the impinging rays (34a, b, c) in the positive or negative y-direction. The possibility also exists of combining the deflection module (40) into arrays of deflection module's (40).

In each of the embodiments described above, the redirection of light beams was achieved using bent surfaces (2, 20, 22, 36, 37, 39) through which the light beams pass. The possibility also exists, however, to employ reflection from these types of surfaces in corresponding arrangement.

According to the invention, electromagnetic beams or ray bundles of the visible spectrum range can be redirected with the redirecting devices described above. This includes wavelengths from the far ultraviolet to the far infrared that allow deflection by refraction and/or reflection.

What is claimed is:

1. A device for redirecting electromagnetic beams or ray bundles in the visible spectrum range, in particular for laser beams, comprising:
   one or more deflecting elements with one or more optically functional interfaces that cause the redirection of a beam or ray bundle striking said deflecting element by refraction or reflection; and
   where said redirecting device includes positioning devices with which said optically functional interfaces can be positioned relative to said beam or ray bundle, characterized in that the optically functional interface is bent in such a way that along a first direction, lying essentially in the optically functional interface, the local inclination of the optically functional interface varies continuously, at least segment-wise, relative to a direction lying essentially in the optically functional interface somewhat orthogonal to the first direction and where the position devices are realized either as
   at least two displacement devices that can displace the deflecting element in two mutually orthogonal directions that are preferably oriented roughly orthogonal to the direction of the beam or ray bundle to be deflected, or
   rotational devices with which the one or more deflecting elements can be at least partially rotated around an axis.

2. The redirecting device according to claim 1, wherein one or more deflecting elements have a generally quadratic shape whereby a interface opposite from said optically functional interface is flat.

3. The redirecting device according to claim 1, wherein a small area in the vicinity of a point roughly in the center of said optically functional interface, and has an orientation parallel to a plane surface of said deflecting element opposite to it.

4. The redirecting device according to claim 3, wherein said optically functional interface, further includes two lines oriented roughly orthogonal to one another run through said point located roughly in its center, along each of which lines the local inclination of said optically functional interface does not change in the direction of said line itself while, in contrast, along each said line the local inclination of the optically functional interface in the direction orthogonal to the corresponding said line varies continuously.

5. The redirecting device according to claim 1, wherein said positioning devices include displacement devices that are connected to the one or more deflecting elements whereby said displacement devices can cause a displacement of the one or more deflecting elements in order to change the deflection of the beam or ray bundle.

6. The redirecting device according to claim 5, wherein said displacement of said deflecting element can be realized in a direction (x, y) that is oriented roughly orthogonal to the direction (z) of said beam or ray bundle to be deflected.

7. The redirecting device according to claim 5, wherein piezoelectric devices are employed as displacement devices.

8. The redirection device according to claim 5, wherein said redirecting device has exactly one deflecting element that is provided with two displacement elements for displacement into mutually orthogonal directions (x, y).

9. The redirecting device according to claim 1, wherein said redirecting device comprises a number of deflecting elements that are combined into an array whereby the individual deflecting elements are each arranged side-by-side, parallel to one another in the same orientation.

10. The redirecting device according to claim 9, wherein said array of said deflecting elements are equipped with displacement elements that allow a displacement of said array in two mutually orthogonal directions (x, y).

11. The redirecting device according to claim 1, wherein said redirecting device comprises one or more deflection module whereby each deflection module contains to deflecting elements.

12. The redirecting device according to claim 11, wherein said optically functional interfaces of said deflecting elements of each deflection module are of a kind that can, at least segment-wise, be laid flat against each other.

13. The redirecting device according to claim 12, wherein that in each deflection module said deflecting elements are oriented so that their optically functional interfaces essentially face each other in the direction (z) of the beam or ray bundle.

14. The redirecting device according to claim 13, wherein one or both of said deflecting elements with optically functional interfaces essentially facing each other are provided with displacement devices so that the two deflecting elements can be displaced relative to one another in one or two mutually orthogonal directions (x, y) oriented essentially parallel to the optically functional interfaces.

15. The redirecting device according to claim 11, wherein each of said deflecting elements of each deflection module has the identical shape.

16. The redirecting device according to claim 11, wherein said redirecting device comprises two deflection modules, each with two deflecting elements.

17. The redirecting device according to claim 1, wherein arrays of said deflecting elements are used in said deflection modules instead of deflecting elements and wherein said redirecting device comprises one or more deflection module whereby each deflection module contains two deflecting elements.

18. The redirecting device according to claim 1, wherein said deflecting elements are prepared from material that is at least partially transparent to the wavelengths employed for said beam or ray bundle to be deflected.

19. The redirecting device according to claim 1, wherein said optically functional interfaces are provided with a mirroring that is at least partially reflective to the wavelengths employed for the beam or ray bundle to be deflected.

20. The redirecting device according to claim 1, wherein said optically functional interface is a twisted surface having a propeller-like shape.

* * * * *